US008738752B2

(12) United States Patent
Charny et al.

(10) Patent No.: US 8,738,752 B2
(45) Date of Patent: May 27, 2014

(54) LOCAL PLACEMENT OF LARGE FLOWS TO ASSIST LOAD-BALANCING

(75) Inventors: Anna Charny, Sudbury, MA (US); David Tsiang, Menlo Park, CA (US); Mohammed Ismael Tatar, Kanata (CA); John Bettink, San Jose, CA (US); David Getchell, Castro Valley, CA (US); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 970 days.

(21) Appl. No.: 12/011,925

(22) Filed: Jan. 30, 2008

(65) Prior Publication Data

US 2009/0193105 A1 Jul. 30, 2009

(51) Int. Cl.
*G06F 15/173* (2006.01)
*G06F 15/16* (2006.01)
*H04L 12/56* (2006.01)

(52) U.S. Cl.
CPC .............. *H04L 47/10* (2013.01); *H04L 47/125* (2013.01)
USPC .......................................... 709/223; 709/235

(58) Field of Classification Search
CPC .............................. H04L 47/10; H04L 47/125
USPC .......................................................... 709/223
See application file for complete search history.

(56) References Cited

U.S. PATENT DOCUMENTS

| | | | | |
|---|---|---|---|---|
| 7,065,045 | B2 * | 6/2006 | Jeffries et al. | 370/230 |
| 2002/0054567 | A1 * | 5/2002 | Fan | 370/230 |
| 2005/0025179 | A1 * | 2/2005 | McLaggan et al. | 370/468 |
| 2005/0053046 | A1 * | 3/2005 | Wang | 370/338 |
| 2005/0265239 | A1 | 12/2005 | Previdi et al. | |
| 2006/0221974 | A1 * | 10/2006 | Hilla et al. | 370/394 |
| 2008/0123532 | A1 * | 5/2008 | Ward et al. | 370/238 |

OTHER PUBLICATIONS

Chim et al., "Traffic Distribution Over Equal-Cost-Multi-Paths", Department of Electronic Engineering, The University of Hong Kong, Pokfulam Road, Hong Kong, Apr. 2004.
Shi et al., "An Adaptive Load Balacer for Multiprocessor Routers", Department of Computing Science, University of Alberta, Edmonton, AB, T6G 2E8, Canada, 2006.

* cited by examiner

*Primary Examiner* — Waseem Ashraf
*Assistant Examiner* — Xiang Yu
(74) *Attorney, Agent, or Firm* — Cindy Kaplan

(57) ABSTRACT

In one embodiment, an apparatus generally comprises one or more input interfaces for receiving a plurality of flows, a plurality of output interfaces, and a processor operable to identify large flows and select one of the output interfaces for each of the large flows to load-balance the large flows over the output interfaces. The apparatus further includes memory for storing a list of the large flows, a pinning mechanism for pinning the large flows to the selected interfaces, and a load-balance mechanism for selecting one of the output interfaces for each of the remaining flows. A method for local placement of large flows to assist in load-balancing is also disclosed.

19 Claims, 5 Drawing Sheets

96

| FLOW ID | COUNTER | MEASUREMENT EPOCH | POINTER TO FLOW IN BIG LIST OR LARGE FLOW LIST |
|---|---|---|---|
| $F_i$ | $X_{Fi}$ | $E_C$ | |
| . | . | . | |
| . | . | . | |
| . | . | . | |
| . | . | . | |
| . | . | . | |
| $F_M$ | $X_{FM}$ | $E_C$ | |

FIGURE 5

LOCAL PLACEMENT OF LARGE FLOWS TO ASSIST LOAD-BALANCING

BACKGROUND OF THE INVENTION

The present disclosure relates generally to load-balancing in a computer network.

In computer networks, packets of data are sent from a source to a destination via a network of elements including links and nodes according to various routing protocols. Each incoming packet at a node, such as a router, is sent to an output path, with the choice of output path made based on information at the router. Data traffic is generally forwarded along a single path from a forwarding node to a receiving node based on an optimum (e.g., best or shortest) route. However, there are certain cases where two or more best paths (e.g., equal cost paths) are available. In these instances, the forwarding node will attempt to implement load-balancing, in which the traffic load is shared equally between the paths.

In conventional load-balancing implementations, a hash algorithm is used to load-balance traffic evenly among output interfaces. However, due to the presence of large volume flows along with low volume flows, conventional implementations may result in a lack of uniformity in the distribution of bandwidth between interfaces and cause congestion at one or more of the interfaces.

BRIEF DESCRIPTION OF THE DRAWINGS

FIG. 5 depicts an example of a table of sampled flows.

DESCRIPTION OF EXAMPLE EMBODIMENTS

Overview

Figure 1:
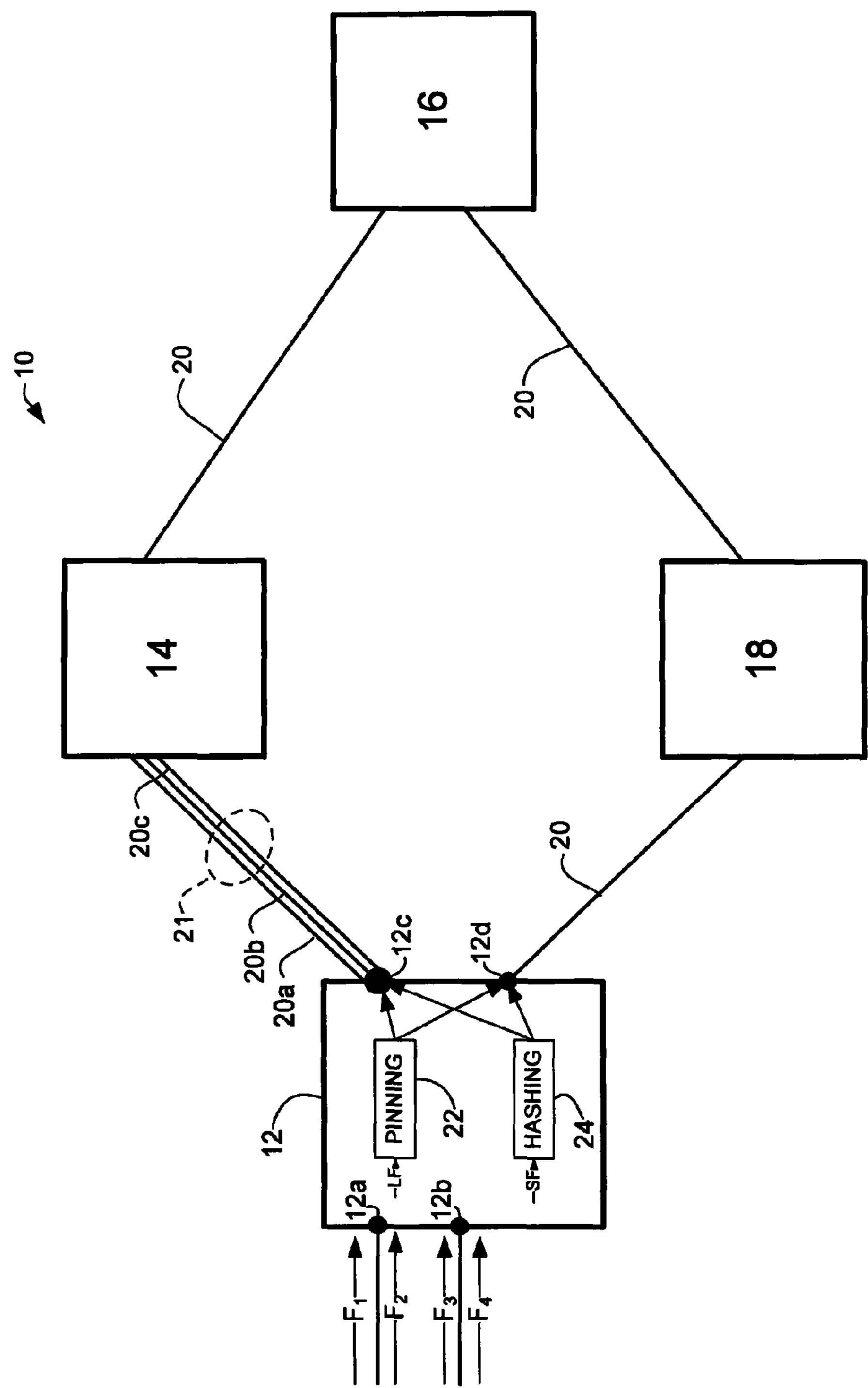
FIG. 1 illustrates an example of a network in which embodiments described herein may be implemented.

A method and apparatus for the local placement of large flows to assist load-balancing are disclosed.

In one embodiment, a method generally comprises receiving a plurality of flows at a node comprising a plurality of output interfaces, identifying large flows in the plurality of flows, selecting one of the output interfaces for each of the large flows to load-balance the large flows over the output interfaces, and pinning the large flows to the selected output interfaces. A selection of output interfaces is also made for each of the remaining flows utilizing a load-balancing process different than used for the large flows.

In another embodiment, an apparatus generally comprises one or more input interfaces for receiving a plurality of flows, a plurality of output interfaces, and a processor operable to identify large flows and select one of the output interfaces for each of the large flows to load-balance the large flows over the output interfaces. The apparatus further includes memory for storing a list of the large flows, a pinning mechanism for pinning the large flows to the selected interfaces, and a load-balancing mechanism for selecting one of the output interfaces for each of the remaining flows.

Example Embodiments

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A hash algorithm is often used to balance traffic across equal-cost paths. However, the presence of large (e.g., high rate, high volume, high bandwidth) flows along with small (e.g., low rate, low volume, low bandwidth) flows may cause a hash algorithm that typically distributes flows uniformly to perform poorly with respect to uniformity of bandwidth distribution. In some cases, the problem may be resolved by changing the granularity of the hash and allowing hashing on more fields in the packet header. For example, if many layer 4 flows constitute one very large layer 3 aggregate, hashing may be implemented based on layer 4 information (e.g., TCP/UDP source and destination ports), in which case the large aggregate flow can be broken into smaller flows. While a hash implementation based on layer 4 and other fields is one solution, it will not always solve bandwidth uniformity problems. For example, layer 4 information may not be available, such as in the case of IPsec (IP Security) tunnels. Also, solutions such as the use of finer granularity of hashing may not fully resolve bandwidth uniformity problems if the layer 4 flows themselves are of large bandwidth.

The method and system described herein address the issue of large flows disrupting a uniform bandwidth distribution typically resulting from a hashing algorithm applied to many small flows.

As described in detail below, the method and system identify large flows, measure the bandwidth of the large flows, remove the large flows from a load-balancing process (e.g., hashing function), and balance the large flows on the interfaces by pinning them to appropriate interfaces. The term "pinning" as used herein refers to associating a large flow with a selected interface or assigning a large flow to a selected interface (e.g., locally placing a large flow at a selected interface). The remaining small flows are load-balanced using the conventional load-balancing process.

Network and Network Device

Referring now to the drawings, and first to FIG. 1, a block diagram of a network 10 in which embodiments described herein may be implemented is shown. The network 10 comprises a plurality of nodes (network devices) 12, 14, 16, 18, interconnected by links (communication paths) 20. The nodes may be connected by a single link 20 (as shown between nodes 12 and 18) or a bundle 21 of links 20*a*, 20*b*, 20*c* (as shown between nodes 12 and 14), for example. A limited number of network elements are shown for simplification and it is to be understood that the network may include any number and type of network devices and links. The nodes 12, 14, 16, 18 may be routers, switches, gateways, or any other suitable network device. Each node 12, 14, 16, 18 comprises network interfaces, such as input interfaces 12*a*, 12*b* and output interfaces 12*c*, 12*d* shown on node 12. The node may have any number of input interfaces (including only one input interface) and any number of output interfaces. Also, the interfaces 12*a*, 12*b*, 12*c*, 12*d* may correspond to a single link 20 or a bundle 21 of links. It is to be understood that the term "interface" as used herein may refer to a single physical link or a link bundle consisting of a plurality of links. Layer 3 load balancing comprises distributing the traffic amongst several network paths and their associated interfaces (which may be links or link bundles). Layer 2 load balancing comprises distributing the traffic amongst the links within a link bundle.

Data traffic may be exchanged among the nodes of the computer network using communication protocols such as Transmission Control Protocol/Internet Protocol (TCP/IP), User Datagram Protocol (UDP), Asynchronous Transfer Mode (ATM) protocol, Frame Relay protocol, etc. Traffic (e.g., flows F1, F2, F3, F4, which may be in the form of packets) is received at ingress interfaces 12*a*, 12*b* at node 12 and forwarded from egress interfaces 12*c*, 12*d* to an adjacent node (node 14 or node 18).

Each node receives, for example, advertised information (e.g., link state packet (LSP) or other advertisement) and constructs an optimum route to each node of the network based on costs along the path. There are certain instances where two or more best paths (e.g., equal cost paths) are available. In these instances, the forwarding node will attempt to implement load-balancing, in which traffic is shared equally between the interfaces. For example, in layer 3 load-balancing, traffic is shared equally between the interfaces. In the case of layer 2 load-balancing, traffic is shared equally between the links within a link bundle. It is possible and not uncommon to perform layer 3 load balancing and layer 2 load balancing simultaneously in a hierarchical manner such that a layer 3 interface is first chosen and if that interface consists of a bundle of links, then a layer 2 link is chosen out of that bundle.

When there are multiple paths or links to load balance over, conventional systems typically utilize a hash algorithm to determine which next hop interface each packet will use. The intention is to split the traffic for a given destination over all of the next hop interfaces (or links in case of layer 2 load balancing) for that destination. Certain information from each packet (e.g., source/destination IP address, etc.) are "hashed" together to give a small integer. This integer determines which of the available next hop links the packet will use. As described in detail below, the present embodiments identify large flows (LF) and take these large flows out of the hashing process. These large flows are then "pinned" to selected interfaces using a pinning mechanism 22. The remaining flows (small flows (SF)) are load-balanced using a conventional hashing mechanism 24 (FIG. 1).

Figure 2:
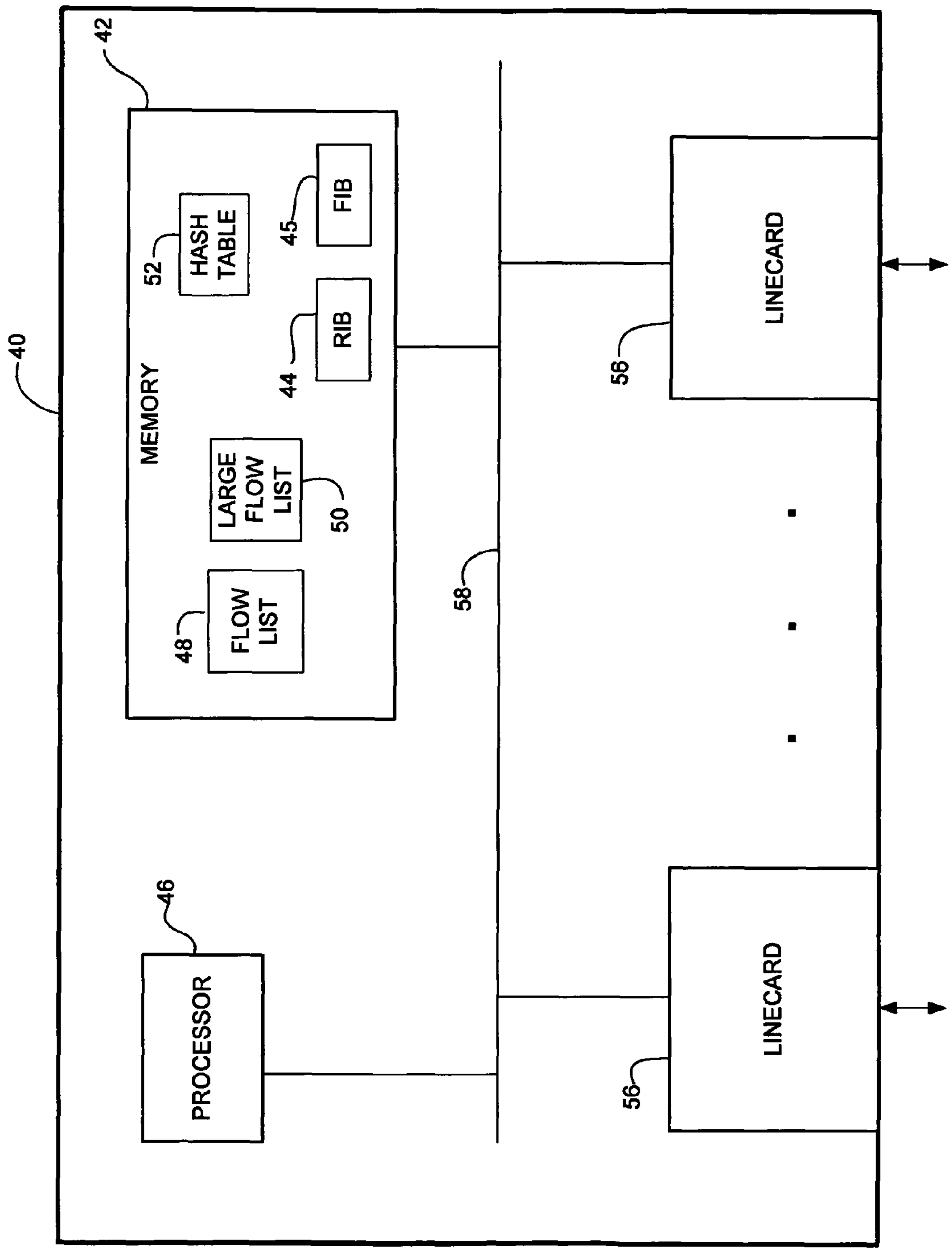
FIG. 2 illustrates an example of a network device useful in implementing embodiments described herein.

The network device may be implemented on a general purpose network host machine such as network device 40 shown in FIG. 2. In one embodiment, network device 40 is a programmable machine that may be implemented in hardware, software, or any combination thereof. The network device 40 comprises one or more processors 46 operable to execute codes stored in memory 42, and a plurality of linecards (network interfaces) 56 interconnected by a bus 58. The memory 42 stores programs and data structures associated with embodiments described herein and is one example of a computer-readable medium. Memory 42 can be a volatile memory. Another form of computer-readable medium for storing computer codes is a type of non-volatile storage such as floppy disks, CD-ROMs, DVD-ROMs, hard disks, flash memory, etc.

Memory 42 may include, for example, a routing information base (RIB) 44 and a forwarding information base (FIB) 45 used in the forwarding of packets received at the network device 40. Memory 42 further includes computer executable instructions executed by the processor 42 to perform functions provided by one or more routing protocols. As described in detail below, memory 42 also contains one or more tables (e.g., flow list 48, large flow list 50, and hash table 52) used in the load-balancing of large flows.

Network device 40 interfaces with physical media via the plurality of linecards 56. Linecards 56 may incorporate Ethernet interfaces, DSL interfaces, Gigabit Ethernet interfaces, 10-Gigabit Ethernet interfaces, SONET interfaces, etc. To implement functionality according to the system, linecards 56 may incorporate processing and memory resources similar to those discussed above in connection with the network device as a whole.

It is to be understood that the network and network device shown and described herein are only examples and that the embodiments described below may be implemented on networks and network devices having various configurations and components.

Process Overview

Figure 3:
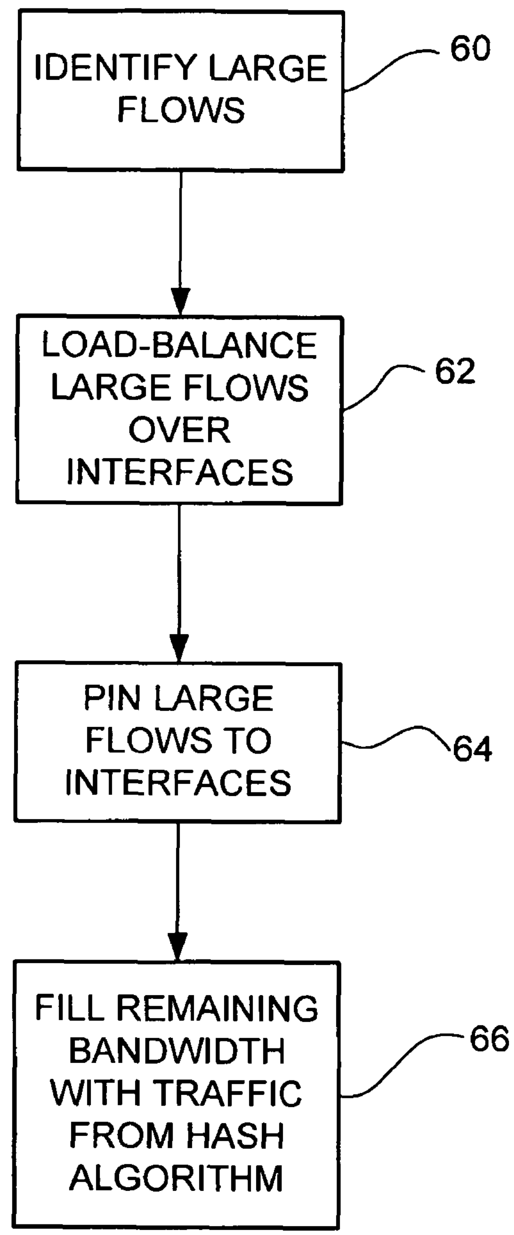
FIG. 3 is a flowchart illustrating a process for the local placement of large flows to assist load-balancing, in accordance with one embodiment.

FIG. 3 is a flowchart illustrating an overview of a process for the local placement of large flows to assist load-balancing, in accordance with one embodiment. At step 60 large flows received at a network device are identified. The large flows are load-balanced over output interfaces at the network device (step 62). The output interface may be may be an interface, sub-interface, or link bundle, for example. The large flows are taken out of a load-balance process used for the remaining flows (non-large flows) and pinned to selected interfaces (step 64). Remaining available bandwidth on each interface is then filled with the remaining flows which are distributed according to a load-balance process different than used for the large flows (step 66). For example, the remaining flows may be load-balanced using a conventional hashing function. Each of the above steps is described in detail in the following sections.

Defining and Identifying Large Flows

A large flow may be defined in reference to the speed of the interfaces that traffic is load-balanced over. For example, a flow may be defined as "large" if it takes more than a specified percentage (e.g., 10%) of interface speed in the load-balancing group (assuming all interfaces in the group are the same speed). There would typically be a small number of such "large" flows and a remaining large number of "small" flows. Typically, most hashes work reasonably well with a large number of small flows. The method and system described herein are configured to distribute large flows generally as uniformly as possible. The small flows can then be distributed using conventional hash algorithms.

The definition of a flow may be the same as used by the hashing function (e.g., source-destination pair) or may be something else, such as the number of several source-destination pairs aggregated into a larger aggregate flow.

In one embodiment, the flows are maintained in two doubly-linked lists, flow list 48 and large flow (LF) list 50. The flow list 48 is referred to herein as a Big List (BL). The BL 48 contains recently seen flows. Once the flow is identified as a large flow, it is moved from the BL 48 to the LF list 50. It is the flows in the LF list 50 that are pinned to selected interfaces. In a preferred embodiment, each list 48, 50 is maintained separately and flows are in either the BL 48 or LF list 50. Details of maintenance of the lists are described further below.

Figure 4:
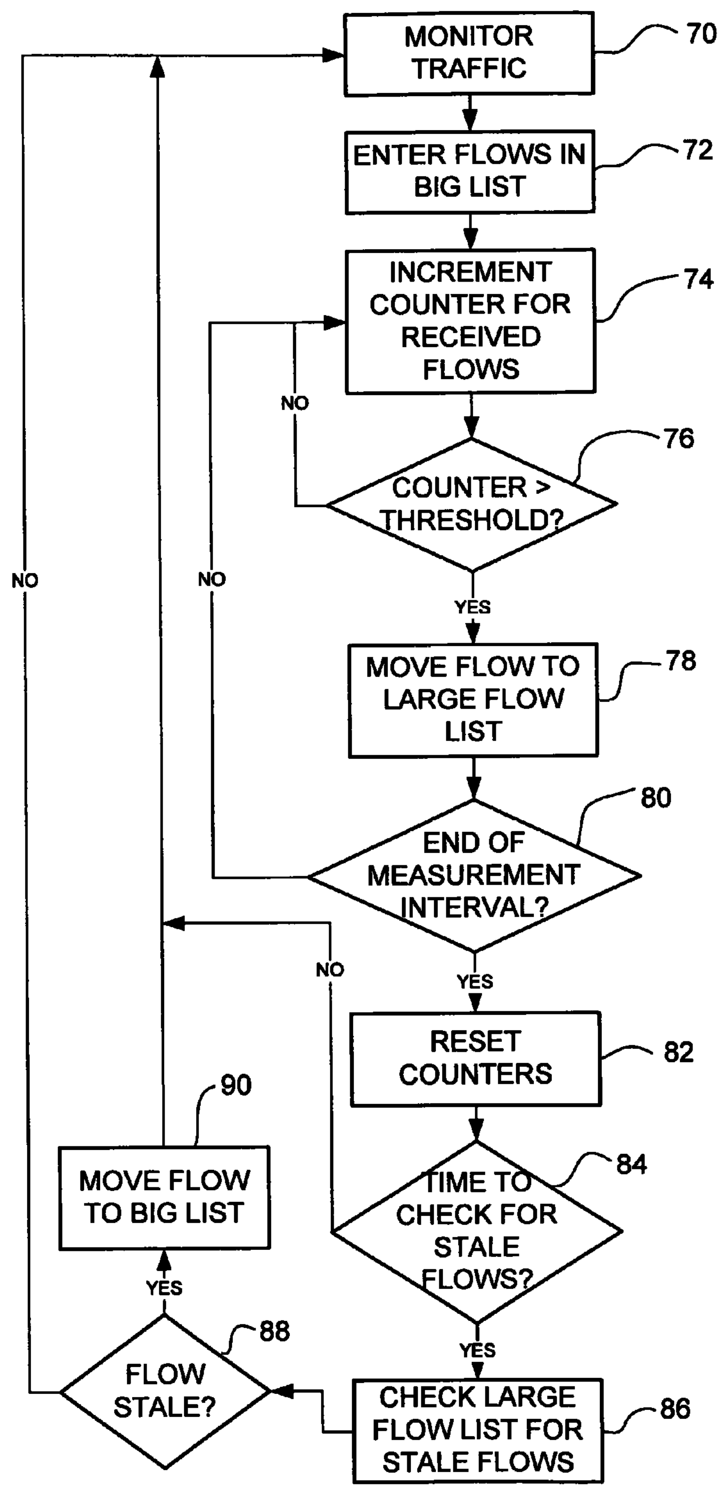
FIG. 4 is a flowchart illustrating one example of a process for identifying the large flows.

FIG. 4 illustrates a process for identifying large flows (step 60 of FIG. 3), in accordance with one embodiment. At step 70 traffic is monitored. As described below, sampling of packets may be used to reduce the overhead associated with identifying large flows from a plurality of flows. The flows are entered into a flow list 48 (step 72). As described in detail below, each flow entry has an associated counter that represents a quantity (e.g., number of bytes) of traffic in the flow in a current measurement interval. The traffic is tracked and counters associated with received flow are incremented at step 74. If the counter exceeds a specified threshold, the flow is considered large and moved from the BL 48 to the large flow list 50 (steps 76 and 78). At the end of the measurement interval, the counters may be optionally reset (steps 80 and 82). In one embodiment, the LF list 50 is periodically checked for stale flows (steps 84 and 86). If a flow becomes stale (i.e., no packets arrive to this flow in a pre-defined time interval), or if the rate of the flow as indicated by its counter decreases below a predefined threshold, the flow is removed from the LF list 50 and added to the BL 48 (steps 88 and 90).

It is to be understood that steps may be removed from the process shown in FIG. 4, additional steps may be added, or the order of the steps may be changed, without departing from the scope of the invention. For example, the LF list 50 may be checked for stale flows at any time before, during, or after a measurement interval or at different intervals (e.g., any time a sampled packet arrives to any flow entry). Also, steps 84-90 may be eliminated and stale entries pushed out of the LF list 50 whenever the list exceeds a maximum size. Additional details of the steps of the flowchart of FIG. 4 are described below.

Sampling

In one embodiment, sampling is used to reduce the overhead associated with identification of large flows. Various methods may be used to select a sampling frequency for the large flows, as is well known by those skilled in the art. In one embodiment, a sampling frequency is selected based on a minimum rate of flow to detect, maximum packet size, and acceptable error rate. The sampling frequency is preferably as low as possible for overhead performance; however, the minimal sampling frequency should be high enough to ensure desired accuracy of estimation of large flow rates. In one embodiment, the sampling frequency and associated measurement time scale is determined to ensure a given accuracy of rate measurements. In one embodiment, sampled NetFlow may be used along with Flexible NetFlow.

Identifying Large Flows from Sampled Packets

The following describes examples of methods that may be used to identify large flows from the sampled packets. It is to be understood that the following are only examples and that other methods may be used to identify the large flows, without departing from the scope of the invention.

In one embodiment, Big List (BL) is limited to a maximum size (M), and the LF list 50 is limited to a maximum size (m). Typically m is much smaller than M. Each flow entry F can be linked in either big list 48 or large flow list 50. Although an implementation may choose to keep a flow entry in both lists at the same time, a preferred embodiment is that a flow entry is in only one of these two lists at a time. Each flow entry F contains a counter that represents the number of bytes (or packets) of the flow seen in the current measurement interval T. In one embodiment, information for each flow may be maintained in a table 96, such as shown in FIG. 5, with pointers that link the flow to one of the two lists 48, 50. In one embodiment, entries include the flow ID for flows ($F_i$ through $F_m$), a counter for the corresponding number of bytes ($X_{Fi}$ through $X_{FM}$) for each flow, and a measurement interval epoch $E_c$, which is used to identify if the counter corresponds to the current measurement interval (FIG. 5). The choice of the interval depends on the sampling frequency, desired accuracy of large flow estimation, and smallest rate of large flow of interest. The state shown in FIG. 5 may be used for both lists (i.e., the same physical data structure linked in two different lists). It is to be understood that the table shown in FIG. 5 is only one example and that additional or different information associated with the flows may be maintained.

When a sampled packet of a flow arrives, hash table 52 may be used to determine if the flow is already included in the hash table. The hash table may include, for example, a flow ID and pointer to the flow in the BL 48 or LF list 50. If the flow is already in the hash table, then it is linked in either the BL 48 or the LF list 50. In this case its entry is moved to the head of the corresponding list. If the flow is not in the hash table, a new entry is created and added to the head of the BL 48. If creation of this new entry causes the size of the BL 48 to exceed a maximum limit M, the entry at the tail of the BL is deleted. The byte counter for the flow is then incremented. If this counter exceeds a predefined threshold, which corresponds to the smallest number of bytes expected for the smallest "large flow" in the chosen interval, then this flow is removed from the BL 48 and is added to the LF list 50, as previously described.

The counters of the flow are intended to keep track of the number of bytes received by the flow in the current measurement interval. If the number of flows in the hash table is large, it is time consuming to reset all the counters when the measurement interval expires. To do this efficiently, in one embodiment, a global measurement epoch ID is maintained and an epoch ID is stored along with the byte counter in the flow state. When a new packet arrives a check is performed on whether the stored epoch ID is the current ID ($E_c$) or an old ID. If the epoch ID is old, counter X is reset before accounting for the newly arrived packet and a new epoch ID is stored. It is to be understood that other time measurements may be used to identify whether the counter needs to be reset for a new time interval.

If a flow that is linked in the BL 48 becomes stale, it is eventually propagated to the tail of the list, and if the BL exceeds its maximum size M, stale flows are eventually removed from the tail of the BL. No special action is taken to remove stale entries from the BL list, other than tail pushout that causes stale entries in the BL 48 to be automatically removed if the list grows above size M.

In most cases, the LF list 50 will be substantially shorter than the BL 48. The LF list 50 is limited to a size m, and may at times be longer than the maximum number of large flows that could fit in the combined interface bandwidth because it may temporarily contain stale entries.

An entry in the BL 48 in which the byte counter X in the current measurement interval (epoch) exceeds a threshold value is removed from the BL and added to the head of the LF list 50. If the addition of this flow entry causes the LF list 50 to exceed its maximum size m, the entry at the tail of the LF list is removed from the LF list and moved to the BL 48. The flow entry can be added to the head or tail of BL 48 when that entry is removed from the LF list 50. When a new packet of a flow which is already in the LF list 50 is received, its entry is moved to the head of LF list. The byte count at the end of the measurement interval divided by the length of the measurement interval times the sample frequency represents the rate measurement estimate at the time scale of the measurement interval. The interval length and sampling frequency ensures that these rate estimates are within a desired accuracy for any flow whose actual rate is that of the smallest desired large flow or higher. Optionally, rate estimates may be computed at a longer timescale than the measurement interval by computing exponential running averages across interval measurements.

As previously discussed, the LF list 50 is preferably cleared of the stale entries so that they are removed from the list of flows that are explicitly pinned. A stale entry is a flow which was once a large flow that either stopped sending packets completely for a long time, or which has its rate reduced substantially below the desired smallest rate. If the total number of active flows exceeds the size m of the LF list 50, then a stale entry will be pushed out of the LF list eventually, and added to the BL 48. The tail pushout process when the BL 48 grows large will eventually remove the stale entry from the BL as well.

In one embodiment, in order to remove the stale entries from the LF list 50, the tail of the LF list 50 is checked any time a sampled packet arrives to any flow entry (regardless of whether that flow entry is in the LF list or BL 48). If the entry at the tail of the LF list 50 is stale, the entry can be removed from the LF list and added to the head (or tail) of the BL 48. The measurement epoch number ($E_c$) stored in the entry may be used to determine if the entry is stale.

It should be noted that because arriving packets of flows in the LF list 50 move the flow entry to the top of the LF list, truly stale entries will eventually propagate towards the tail of the LF list. Therefore, examining the tail every time a sample packet arrives to BL 48 or the LF list 50 will clear stale entries in the LF list over time.

Another option is to add a background scan of all of the LF list entries to take care of the corner cases when all or most of the large flows become stale. The background scan can also speed-up the cleanup process if the arrival rate of sampled packets becomes too slow due to a low interface utilization.

The following describes removal of former large flows which have slowed down but are not inactive, from the LF list 50. One way to detect a flow in which the rate has decreased below the large flow threshold is to remove a flow when its previous interval measurement is below the desired threshold.

Alternatively, the rate of the large flow can be measured over a longer timescale before removing it from the LF list 50. This allows for temporary rate reductions to be ignored before changing the pinning decision (described below). This may be accomplished, for example, by adding not only the packet count in the current measurement interval, but also maintaining an exponential running average over subsequent intervals. When the running average falls sufficiently below the minimal rate of a large flow (accounting for estimation error), the large flow can be removed from the LF list 50.

Once the large flows are identified, interfaces are selected for each of the large flows to load-balance the large flows over the interfaces.

Determining Where to Place Large Flows

After the large flows have been identified, they are removed from the hashing process, load-balanced over the output interfaces, and pinned to selected interfaces. Load-balancing of the large flows is performed in a coordinated manner across multiple interfaces to ensure that flows pinned to a particular interface coming from different input interfaces or different load-balancing groups do not overload a given output interface. As noted above, the interfaces may be individual interfaces, sub-interfaces, or link bundles containing a plurality of interfaces. In the case of a link bundle, load-balancing may be performed over the link bundles or over the interfaces in a link bundle. The interfaces selected in the pinning decision for the large flows may be different than those that would have been selected if the hashing mechanism were used.

The decision as to where to place the large flows may take into account both layer 2 (L2) and layer 3 (L3) interface bandwidths or only L2 or L3 bandwidth. The decision may take into account factors such as identified rates of large flows, configuration of load-balancing groups (i.e., which set of interfaces can be used by a particular large flow), current usage of the bandwidth on all output interfaces of interest due to other already placed large flows, capacity of link, or any combination of these or other parameters. The pinning decisions are preferably performed in a centralized manner, such as by the route processor.

If large flows are identified on all interfaces, the large flows are distributed among the interfaces in such a way as to minimize congestion. The interface may be considered congested if its utilization exceeds a predefined threshold, for example.

The bandwidth of output interfaces is preferably utilized by the large flows in as uniform manner as possible. For example, one objective may be to maximize the minimal remaining bandwidth of all interfaces in an absolute manner or relative to the interface bandwidth, if there is a significant difference in interface bandwidths. Another possible objective is to minimize the average utilization of all interfaces.

The interface selection can be formulated as a constraint optimization problem, for example. Alternatively, heuristic methods may be used. For example, starting with the largest flow, select the interface with the highest remaining bandwidth.

In one embodiment, interface utilization counters, and optionally drop counters, are used to derive the current load of total traffic on a given interface. Loads D(i) on interfaces i and a set of large flows j with rate estimates R(j) are used to compute bandwidth L(i) as follows:

L(i)=D(i)−(Sum of all R(j) of all large flows j currently assigned to interface i). Some or all of the large flows are repacked among the interfaces so that no interface is congested.

In one embodiment, a direct application of a bin-packing problem with equal or unequal size bins may be used. A number of heuristics of various complexities are available to solve this problem. For example, "first fit", "best fit", "worst fit" as well known by those skilled in the art, may be used. Another option is to use methods generally known as Mathematical Programming, for which a number of optimization algorithms are available. It is to be understood that the mathematical models described above are only examples and that other models and heuristics may be used to distribute the large flows to avoid congestion at any interface.

In addition to the criteria that no interface is congested, additional optimization criteria may be specified. For example, the number of large flows to be moved from one interface to another may be minimized. Also, the worst utilization of any given interface may be minimized.

The pinning decisions may be performed periodically. The pinning decision may also be triggered by events such as discovery of a new large flow, removal of an old large flow, interface failure, etc.

The following describes how the large flows are pinned to the selected interface.

Mechanisms for Pinning Large Flows

The following describes examples of pinning mechanisms that may be used to pin the large flows to selected interfaces, once the large flows and the interfaces they need to be pinned to are identified. It is to be understood that the mechanisms described below are only examples and that different mechanisms may be used for pinning the large flows, without departing from the scope of the invention.

Load-Balance Specific Pinning

In one embodiment, a pinning classification lookup is performed as part of the load balancing operation. Normally, a packet forwarding lookup will lead to a L2 load-balance table whereupon a hash is performed that leads to the selection of a particular interface. For example, the following databases may be traversed: PLU (prefix lookup) (e.g., tree-bitmap mtrie prefix lookup in DRAM (Dynamic Random Access Memory)); L3 Loadinfo lookup; L3 Loadbalance table; L2 Loadinfo lookup; and L2 Loadbalance table. In one embodiment, a bit in the L2 Loadinfo is used to indicate the need for doing a load-balance specific planning (LBSP) TCAM (Ternary Content Addressable Memory) classification lookup. The additional LBSP TCAM lookup may be done in parallel with the next lookup in the normal traversal (e.g., L2 Loadbalance table lookup). If the LBSP TCAM lookup results in a match, then the action specified by the TCAM lookup (as stored in the TCAM associated SRAM (Static Random Access Memory)) is performed instead of the normal load-balancing action.

It is to be understood that the lookup process described above is only one example and that the pinning lookup may be identified in different lookup tables or during different lookup processes.

Policy-Based Routing Pinning

Policy-Based Routing (PBR) provides a means of routing packets by allowing for the configuration of a defined policy for traffic flows, lessening reliance on routes derived from routing protocols. PBR may be used, for example, to classify traffic based on extended access list criteria, set IP Precedence bits, or route packets to specific traffic-engineered paths. Policies can be based on IP address, port numbers, protocols, size of packets, or any combination thereof.

In one embodiment, a PBR mechanism is used to perform the pinning operation. PBR is used to specify a generic n-tuple classifier (match criteria) plus an action (set clause). The match criteria may contain the usual flow classification fields of IP destination address, IP source address, TCP/UDP source port, and TCP/UDP destination port. The set clause actions include the ability to list a preferred exit interface, sub-interface, or link bundle. If the exit interface is down, alternate interfaces or IP next-hop addresses may also be listed.

If PBR is configured on an interface, then a PBR classification lookup is performed. If the lookup is found, it will supersede any normal forwarding lookup that is done. In this way, a flow that is to be pinned can be specified and a PBR entry created for that flow. The PBR entry bypasses the normal forwarding and therefore will also bypass any load-balancing that is associated with the normal forwarding path.

In one embodiment, the PBR classification is performed as a TCAM lookup. PBR lookups are preferably performed on both the ingress and egress interfaces in the case of a two-stage forwarding engine.

In one embodiment, PBR is enabled on all interfaces that may receive traffic. In another embodiment, the system is optimized based on flow definition to reduce the number of interfaces that are PBR enabled. For example, a specific IP source/destination pair may be populated on the ingress interface that it arrives on.

Destination Prefix Specific Pinning

In another embodiment, a flag is placed in the Forwarding Information Base (FIB) to indicate that flows with a particular destination prefix have been pinned. When the forwarding engine performs the FIB lookup in order to determine how to forward the packet, it can use the flag to invoke the pinning lookup when the flag is set.

Selection of Pinning Mechanism

Each of the above mechanisms has its own advantages and selection of the mechanism may be based on existing configuration of a network device and available resources. In a preferred embodiment load-balance specific planning is used since it has the advantage that only packets that are forwarded to load-balanced tables which have pinned entries are affected by the additional lookup.

Load-Balancing Small Flows

Once the large flows are pinned, the remaining bandwidth may be filled by the remaining flows (small flows) that go through the conventional hashing process or other suitable load-balancing process. If the remaining bandwidth is unevenly distributed, it may be useful to weigh the hash so that more traffic is sent to interfaces with higher available bandwidth. The weights of the hashing algorithms may be adjusted to reflect any potential differences in the remaining bandwidth available for the rest of the hash. For example, more hash buckets may be assigned to higher bandwidth interfaces. Also, link utilization may be used in the hash calculation.

Although the method and system have been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:

receiving a plurality of flows at a node in a computer network, the node comprising a plurality of output interfaces;

identifying large flows in said plurality of flows;

selecting one of said plurality of output interfaces for each of said large flows to load-balance said large flows over said plurality of output interfaces independent from remaining flows;

assigning said large flows to the selected output interfaces; and selecting one of said plurality of output interfaces for each of said remaining flows not identified as one of said large flows utilizing a load-balancing process different than used to load-balance said large flows, wherein selecting one of said plurality of output interfaces for each of said remaining flows comprises utilizing a hash algorithm to load-balance said remaining flows;

wherein said remaining flows are load-balanced independent from said large flows and said large flows stay assigned to the selected output interfaces so that said large flows are not part of said load-balancing process for said remaining flows.

2. The method of claim 1 wherein identifying said large flows comprises sampling data packets from said plurality of flows received at the node before said large flows are pinned to the selected interfaces.

3. The method of claim 2 wherein a sampling frequency is selected based on a minimum rate of flow to detect, maximum packet size, and acceptable error rate.

4. The method of claim 1 wherein identifying large flows comprises storing a first list of said plurality of flows and incrementing a counter associated with one of said flows upon receiving traffic for said flow and before selecting said interfaces for said large flows or said remaining flows.

5. The method of claim 4 further comprising entering said flow into a second list upon said counter reaching a specified threshold, said second list containing all of said large flows.

6. The method of claim 1 wherein selecting one of said plurality of output interfaces for each of said large flows comprises utilizing layer 2 load balancing, layer 3 load balancing, or both layer 2 and layer 3 load balancing.

7. The method of claim 1 wherein selecting one of said plurality of output interfaces for each of said large flows comprises minimizing an average utilization on each of said plurality of output interfaces.

8. The method of claim 1 wherein pinning each of said large flows to its selected output interface comprises indicating in a lookup table that an additional lookup is needed for said large flows.

9. The method of claim 1 wherein pinning each of said large flows to its selected output interface comprises utilizing policy-based routing.

10. The method of claim 1 wherein pinning each of said large flows to its selected output interface comprises inserting a flag in a forwarding information base to identify a pinning lookup.

11. The method of claim 1 further comprising assigning a weight to said hash algorithm based on differences in bandwidth remaining after pinning said large flows.

12. An apparatus comprising:

one or more input interfaces for receiving a plurality of flows;

a plurality of output interfaces;

a processor operable to identify large flows in said plurality of flows and select one of said plurality of output interfaces for each of said large flows to load-balance said large flows over said plurality of output interfaces independent from remaining flows;

memory for storing a list of said large flows;

a pinning mechanism for assigning said large flows to said selected interfaces; and a load-balancing mechanism for selecting one of said output interfaces for each of said remaining flows not identified as one of said large flows, wherein selecting one of said plurality of output interfaces for each of said remaining flows comprises utilizing a hash algorithm to load-balance said remaining flows;

wherein said remaining flows are load-balanced independent from said large flows and said large flows stay assigned to the selected output interfaces so that said large flows are not part of said load-balancing process for said remaining flows.

13. The apparatus of claim 12 wherein said load-balancing mechanism comprises a hashing mechanism.

14. The apparatus of claim 12 wherein the pinning mechanism is configured to identify in a lookup table that a pinning lookup is needed.

15. The apparatus of claim 12 wherein the pinning mechanism is configured to insert a flag in a forwarding information base to identify a pinning lookup.

16. The apparatus of claim 12 wherein selection of said output interfaces for said large flows is based on layer 2 load balancing at the output interfaces.

17. The apparatus of claim 12 wherein selection of said output interfaces for said large flows is based on rates of said large flows.

18. The apparatus of claim 12 wherein said memory further comprises counters associated with each of said flows.

19. An apparatus comprising:

a plurality of output interfaces;

means for receiving a plurality of flows;

means for identifying large flows in said plurality of flows;

means for selecting one of said plurality of output interfaces for each of said large flows to load-balance said large flows over said plurality of output interfaces independent from remaining flows;

means for assigning said large flows to the selected output interfaces; and means for selecting one of said plurality of output interfaces for each of said remaining flows not identified as one of said large flows utilizing a load-balancing process different than used for said large flows, wherein selecting one of said plurality of output interfaces for each of the remaining flows comprises utilizing a hash algorithm to load-balance said remaining flows;

wherein said remaining flows are load-balanced independent from said large flows and said large flows stay assigned to the selected output interfaces so that said large flows are not part of said load-balancing process for said remaining flows.

* * * * *